Fig. 1

Oct. 31, 1950        E. E. HEWITT        2,528,143
LOAD COMPENSATING FLUID PRESSURE BRAKE EQUIPMENT
Filed April 28, 1948        2 Sheets-Sheet 2

Fig. 2

INVENTOR.
Ellis E. Hewitt
BY
Frank E. Miller.
ATTORNEY

Patented Oct. 31, 1950

2,528,143

UNITED STATES PATENT OFFICE 2,528,143

LOAD COMPENSATING FLUID PRESSURE BRAKE EQUIPMENT

Ellis E. Hewitt, Edgewood, Pa., assignor to The Westinghouse Air Brake Company, Wilmerding, Pa., a corporation of Pennsylvania Application April 28, 1948, Serial No. 23,687

17 Claims. (Cl. 303—22)

This invention relates to fluid pressure operated brakes for railway vehicles or cars and more particularly to the load compensating type which vary the degree of braking of a car in accordance with variations in the weight thereof which varies in accordance with the loaded or empty condition of said car.

A trend toward the use of light weight materials in the construction of railway cars has resulted in the provision of a load compensating fluid pressure brake equipment which has been put into service on railway cars in the United States and is known as the "ABLC" brake equipment. This equipment is substantially the same as the load compensating fluid pressure brake apparatus shown and described in a patent application of Earle S. Cook et al., Serial No. 736,010, filed March 20, 1947, now Patent No. 2,482,246, granted Sept. 20, 1949. Now, however, it is proposed to build freight cars which will be outside the normal weight ranges such as, for example, a freight car having a 90 ton capacity, for which it is believed the braking power of the aforesaid "ABLC" brake equipment would be inadequate.

The principal object of the invention therefore is to provide braking apparatus which will operate in conjunction with a load compensating brake of the aforementioned type to provide additional braking force, variable in accordance with the load on the car, in order to obtain sufficient load compensating braking power for such high capacity cars.

In order to attain this object I add to the "ABLC" brake equipment an additional brake cylinder device and valve means controlled by the pressures of fluid in the compensating brake cylinder device of the "ABLC" brake equipment to control the pressure of fluid in the additional brake cylinder device in such a manner that the total braking force on the car will vary according to the loaded conditions thereof. Preferably the additional brake cylinder device is employed for braking one truck of the car and the compensating brake cylinder device of the "ABLC" brake equipment is employed for braking the other truck on the car.

More specifically, the compensating brake cylinder device of the "ABLC" brake equipment comprises a brake cylinder piston having the usual pressure chamber at the front side and a second or compensating pressure chamber at the opposite side. The well-known AB valve of the "ABLC" equipment is employed for varying the pressure of fluid in the usual pressure chamber at the front side of the brake cylinder piston and a load compensating valve device, also constituting a part of the "ABLC" equipment, is automatically adjustable according to the empty or loaded condition of the car, to operate in response to the pressure of fluid in the usual pressure chamber to vary pressure of fluid in said second chamber, from atmospheric pressure for a fully loaded car substantially inversely in proportion to the degree of load, for thereby varying the effect of the pressure of fluid on the front of the piston to apply the brakes, as a result of which the degree of braking of the one truck of the car will be varied in proportion to the degree of load carried thereby.

According to the invention the additional brake cylinder device employed for braking the other car truck is of conventional type having a pressure chamber only at the one side of the piston, and a self-lapping relay valve device is arranged for control by the pressures acting on opposite sides of the compensating brake cylinder piston in such a manner as to vary the pressure of fluid in the additional brake cylinder device and thereby the degree of braking of the respective truck in proportion to the load thereon.

Other objects and advantages will become apparent from the following more detailed description of the invention.

In the accompanying drawings.

Description

Figure 1:
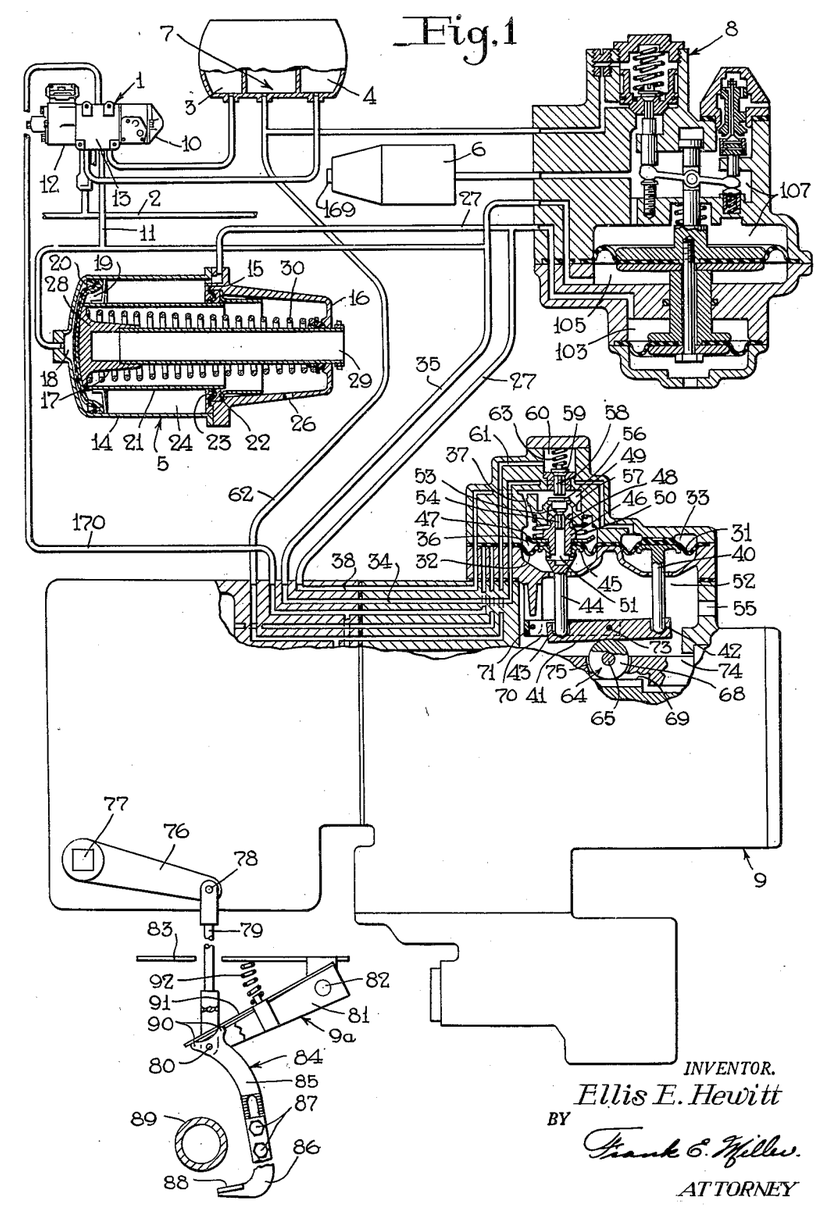
Fig. 1 is a diagrammatic view, partly in outline and partly in section, of a load compensating fluid pressure brake equipment embodying the invention.

As shown in Fig. 1, the load compensating brake apparatus comprises a brake controlling valve device 1 to which is connected the usual brake pipe 2, auxiliary reservoir 3, emergency reservoir 4, a load compensating brake cylinder device 5, a load compensating reservoir 7, a load compensating relay valve device 9, and a weighing gear or load adjusting mechanism 9a; the parts so far enumerated constituting the "ABLC" equipment above mentioned. According to the invention the brake apparatus further comprises a supplementary brake cylinder device 6 of conventional structure having a single pressure chamber, and a variable load relay valve device 8. The auxiliary, emergency and load compensating reservoirs are preferably in a common casing separated by dividing walls as shown in Fig. 1 of the drawings. It is also preferred that the load compensating reservoir 7 be of larger capacity than that employed in the aforementioned "ABLC" load compensating brake equipment as required by the additional brake cyclinder device 6. All of the above enumerated structure is adapted to be carried by a sprung part of the car such as the under surface of the floor or center sill of a car.

The brake controlling valve device 1 may be of substantially the same construction and have the same operating characteristics as the AB valve device fully described in the patent to Clyde C. Farmer, No. 2,031,213, issued Feb. 18, 1936, in view of which it is not deemed necessary to show and describe this device in detail. Briefly, however, the brake controlling valve device 1 comprises a service portion 10 adapted to operate upon both a service and an emergency reduction in pressure of fluid in the brake pipe 2 for supplying fluid under pressure from the auxiliary reservoir 3 to a brake cylinder pipe 11 and thence to the brake cylinder device 5 for, upon a service reduction in brake pipe pressure, effecting a service application of brakes on the car. The brake controlling valve device 1 also comprises an emergency portion 12 which is adapted to operate only upon an emergency reduction of pressure of fluid in brake pipe 2 for supplying fluid under pressure from the emergency reservoir 4 to pipe 11 and thence to brake cylinder device 5, wherein such pressure, in addition to that provided from the auxiliary reservoir 3 by operation of the service portion 10, is adapted to operate the brake cylinder device 5 for effecting an emergency application of brakes on the car. The service and emergency portions 10 and 12 of the brake controlling valve device 1 are mounted on opposite faces of a pipe bracket 13 to which all pipe connections to said valve device are made, as shown in the drawing.

The brake cylinder device 5 comprises a hollow cup-shaped casing 14 to the open end of which is secured an annular pressure head 15 from which projects a hollow cup-shaped non-pressure head 16. A brake cylinder piston 17 is slidably mounted in the casing 14 and at one or the front side thereof is the usual or a main pressure chamber 18 to which is connected the pipe 11. The brake cylinder piston 17 comprises a piston head 19 to one face of which is connected a flexible packing cup 20 for preventing leakage of fluid under pressure from the pressure chamber 18 to the opposite side of the piston. Secured to and projecting from the piston 17 in a direction away from the pressure chamber 18 is a hollow stem 21 the opposite end of which is slidably mounted in a ring 22 secured in the pressure head 15. Carried by the pressure head 15 and ring 22 is a packing cup or ring 23 having sealing and sliding contact with the outer peripheral surface of the stem 21 for preventing leakage of fluid under pressure from a compensating pressure chamber 24 formed around said stem between the pressure head 15 and the piston 17, to a non-pressure chamber 25 formed within said stem and open to the interior of the non-pressure head 16 and thence to atmosphere through a port 26 in said non-pressure head. The chamber 24 is open to a pipe 27 through which fluid under pressure is adapted to be supplied to and released from said chamber by operation of the compensating valve device 8, in a manner hereinafter described.

The piston head 19 is provided with a hollow boss 28 projecting into the hollow stem 21 in coaxial relation to said head and stem, and one end of a hollow rod 29 is secured in said boss. The rod 29 extends through the non-pressure chamber 25 and a bore provided in the outer end of the non-pressure head 16 to the exterior thereof, said rod being hollow to accommodate the usual push rod (not shown) for connecting the piston head 17 to the brake rigging (not shown) for one truck of the car. Encircling the hollow rod 29 is a brake cylinder piston release spring 30 one end of which bears against the piston head 19 for moving the brake cylinder piston 17 to its brake release position, in which it is shown in the drawing. The opposite end of the release spring 30 is supported on the non-pressure head 16.

The load compensating device 8 comprises pilot and balancing flexible diaphragms 31 and 32, respectively, preferably of the same area arranged edge to edge in spaced relation and with their axes parallel. At one side of diaphragm 31 is a pressure chamber 33 which is connected to the brake cylinder pipe 11 through a passage 34 and a pipe 35. At the same side of diaphragm 32 is a balancing chamber 36 which is connected to pipe 27, leading to pressure chamber 24 in the brake cylinder device, by way of a choke or restricted passage 37, a passage 38 and pipe 27. Engaging the opposite face of diaphragm 31 is a follower 39 provided on one end of a stem 40, the opposite end of which engages an equalizing member or beam 41 within a pocket 42. Engaging the opposite end of the beam 41 within a similar pocket 43 is one end of a stem 44. The opposite end of stem 44 is in the form of a follower 45 which is secured to the side of diaphragm 32 opposite chamber 36 by means of a nut 46 contained in said chamber and between which nut and diaphragm is interposed a spring seat 47.

The nut 46 has an extension 48 slidably mounted in a bore in the casing and separating chamber 36 from a chamber 49 which is in communication with the passage 38. A pre-compressed spring 50 contained in chamber 36 has one end supported by the casing while its opposite end bears against the spring seat 47. The nut 46 and extension 48 thereof are provided with an axial bore 51 open at one end to a chamber 52 in the casing and provided around the opposite end with a valve seat arranged for engagement by a release valve 53 which is contained in chamber 49 and which has a fluted stem 54 slidably mounted in said bore. Chamber 52 is in constant communication with atmosphere through a passage 55. It will be noted that the diaphragm stems 40, 44 and beam 41 are contained in chamber 52 and that the lower faces of the two diaphragms 31 and 32 are both subject to atmospheric pressure in said chamber.

The release valve 53, opposite the fluted stem 54, has an enlarged annular collar 56, one side of which is provided for contact with a combined valve guide and stop element 57 projecting from the casing into chamber 49, while the opposite side is arranged for contact by the end of a fluted stem 58 of a coaxially arranged fluid pressure supply valve 59 which is contained in a chamber 60. The chamber 60 is open to a passage 61 leading to a pipe 62 which is connected to the load reservoir 7. A bias spring 63 contained in chamber 60 bears on the supply valve 59 for urging it toward its seat.

The side of the equalizing member or beam 41 opposite that from which the diaphragm follower stems 40 and 44 project is supported on a fulcrum, preferably in the form of a roller 64, which is carried by an axle 65. Mounted on end portions 67 of the axle 65 are rollers 68, one disposed at either side of the beam 41 and arranged to roll on a flat surface 69 in the casing. The surface 69 is formed at right angles to the normal, parallel axes of the diaphragms 31 and 32.

The equalizing member or beam 41 is held against longitudinal movement by a yoke 70 pivoted at one end on a pin 71 carried in arms 72 projecting from the casing. The yoke 70 embraces the beam 41 between the rollers 68, and is pivotally connected at the other end to said beam near its center by a pin 73. The roller 64 is adapted to be adjusted relative to the beam 41 longitudinally thereof to provide at its line of contact with the beam a fulcrum therefor, the yoke 70 being effective during such adjustment, and at all other times, to prevent longitudinal movement of said beam but in no way interfering with rocking movement of the beam about its fulcrum connection with the roller 64, which will be later described.

The fulcrum roller 64 has two extreme positions with respect to the equalizing member or beam 41, one position being that in which it is shown in the drawing, which position will hereinafter be referred to as the empty position which said roller will occupy when the car is empty. In the other extreme position to be hereinafter referred to as full-load position, the roller 64 will be substantially below the end of the diaphragm follower stem 40 and this position will be assumed when the car is fully loaded. For various degrees of car load between empty and full-load the roller 64 will assume a corresponding position between the empty and full-load positions, just mentioned.

A lever 76 disposed outside of the casing has one end secured to turn with a shaft 77 while connected to its opposite end by a pin 78 is one end of a connecting rod 79. The other end of rod 79 is connected by a pin 80 to one end of an arm 81, the opposite end of which is mounted to turn on a pin 82 carried by a sprung part 83 of the car.

Also pivoted on the pin 80 is the upper end of a measuring arm 84 comprising overlapping, upper and lower parts 85 and 86, respectively, rigidly clamped together by lock bolts 87. The lower end of the lower part 86 has an offset portion provided with a striking surface 88 for contacting the underside of an unsprung part 89 of the car truck in a substantially horizontal position of said surface. At each side of pin 80 the measuring arm 81 has an upstanding ear 90, the two ears being arranged for engagement by one end of a leaf spring 91 extending parallel to and over the top of the arm 81 and secured at its opposite end to said arm. A bias spring 92 is interposed under pressure between arm 81 and the sprung part 83 for normally biasing the arm 81, the lever 76 and the connecting parts to the position in which they are shown in the drawing, under which condition the measuring arm 81 is biased by spring 91 to the position in which it also is shown in the drawing.

Figure 2:
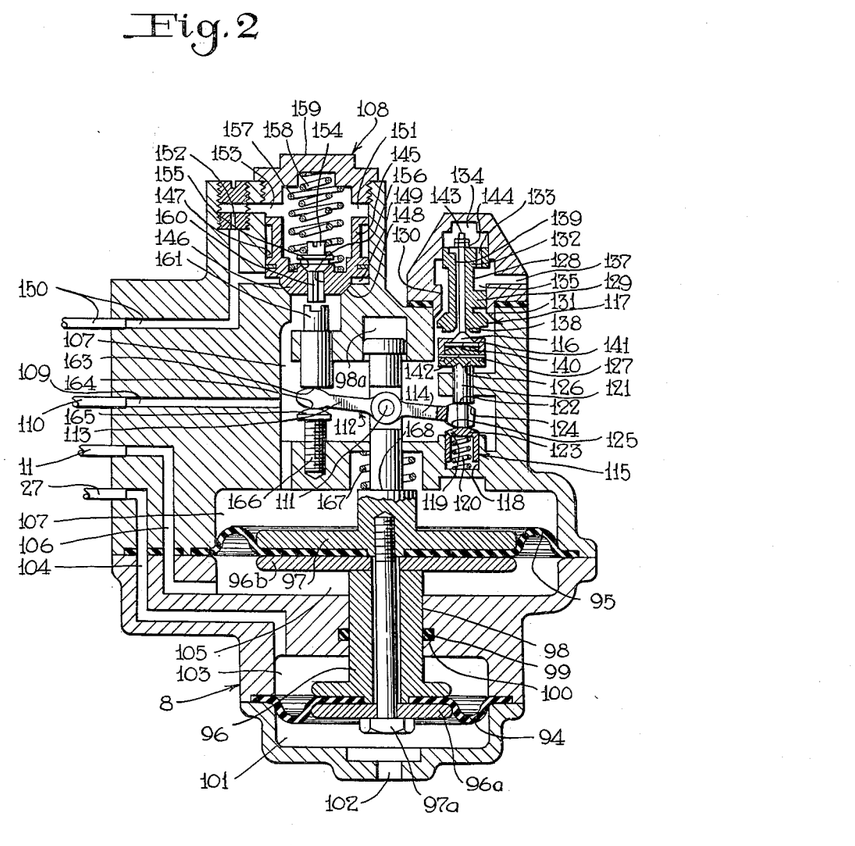
Fig. 2 is an enlarged diagrammatic view of a portion of the apparatus shown in Fig. 1.

The relay valve device 8 comprises a casing 93 having clamped at their peripheries between several sections thereof a relatively small diaphragm 94 and a relatively large diaphragm 95, which are positively connected together by means of a stem and follower 96, followers 96a and 96b, stem and follower 97 and a tie bolt 97a. The stem 96 is slidably mounted intermediate its ends in a bore 98 formed in casing 93 while the stem 97 is slidably mounted at its end in a bore 98a in said casing. A sealing ring 99 is contained in an annular groove 100 in the wall of the bore 98 for preventing leakage through said bore. At the outer side of the small diaphragm 94 is a chamber 101 which is open to atmosphere by way of a passage 102. At the inner side of the diaphragm 94 is a chamber 103 which is in open communication by way of a passage 104 and a portion of the pipe 27 with the compensating pressure chamber 24 of the load compensating brake cylinder device 5. At one side of the large diaphragm 95 is a chamber 105 which is in constant open communication with the brake controlling valve device 1 by way of a passage 106 and the brake cylinder pipe 11. At the other side of the large diaphragm 95 is a valve chamber 107 of a self-lapping valve unit 108 of the well-known type, which chamber is connected by way of a passage 109 and a pipe 110 to the conventional brake cylinder device 6.

The self-lapping valve unit 108 is arranged to be operated by the stem 97 upon which is mounted a shaft 111 which carries a rockable lever 112. The lever 112 is provided with oppositely disposed arms 113 and 114 which are adapted to control the operation of a supply valve mechanism and an exhaust valve mechanism, respectively.

The exhaust valve mechanism comprises a plunger 115 slidably mounted at one end in the casing 93, a pilot exhaust valve 116 and main exhaust valve 117. One end of the plunger 115 has a central bore 118 which is open to the chamber 107 by way of a passage 119 in order to prevent trapping air, and effecting a dash pot action when the plunger is moved. Contained in the bore 118 is a spring 120 which operatively engages the plunger 115 and which, as will hereinafter more fully appear, exerts a light counter-balancing pressure on the diaphragm assemblage. Intermediate its ends as indicated by the reference character 121 the plunger 115 is reduced in diameter to form spaced shoulders 122 and 123 which are adapted to be operatively engaged by spaced convex surfaces 124 and 125, respectively, on end portion of the arm 114 of the lever 112, said end portion being forked to accommodate the reduced portion 121 of the plunger. The plunger 115 is provided with a collar 126 beyond which the plunger is provided with a screw-threaded portion 127.

The main exhaust valve 117 is provided with a stem 128 which is in axial alignment with the plunger 115 and which is provided with radially spaced guide lugs 129 which slidably engage the inner surface of a bore 130 in the casing, said bore being provided at one end with a valve seat 131 for the exhaust valve. The valve stem 128 is integrally connected to a piston 132 which is slidably mounted in the bore 130 and this piston is provided with a small port 133 which constantly connects a chamber 134 at one side of the piston to a chamber 135 at the opposite side thereof which latter chamber is constantly open to atmosphere through passage 137. The main exhaust valve is provided with a valve seat 138 on which, as will hereinafter be more fully described, the pilot exhaust valve 116 is adapted to seat and is provided with an axial bore 139 which extends from the valve seat 138 through the valve stem 128 to the outer face of the piston 132.

The pilot exhaust valve 116 is in axial alignment with the plunger 115 and main exhaust valve 117 and is provided with a circular head 140 which is in abutting relation with the screw-threaded portion 127 on the plunger by means of a hooded nut 141, said nut being held against accidental turning by means of a pin 142, which passes through the nut and plunger and which is peened at each end over the nut. The valve 116 is provided with a stem 143 which passes longitudinally through the bore 139 in the main exhaust valve 117 and which at its end is provided with a stop nut 144 for close engagement with the piston 132. It will be understood that the pilot exhaust valve 116 is movable relative to the main exhaust valve 115 and that by reason of spaced lugs 129 the pilot exhaust valve is centralized with relation to the main exhaust valve and that when the pilot exhaust valve is open as shown in the drawings there will be an open communication between the piston chamber 135 and a pressure chamber 107 by way of the bore 139.

The supply valve mechanism may comprise a valve piston which in the present embodiment of the invention consists of a piston 145 and a main supply valve 146 formed integrally therewith which piston is slidably carried in a bore 147 in the casing 93. The bore 147 is provided at one end with a valve seat 148 and leads from a chamber 149 at one side of piston 145 to the pressure chamber 107, said chamber 149 being in constant open communication by way of a passage and pipe 150 with a fluid pressure source of supply such as the load compensating reservoir 7. The main supply valve 146 is movable into and out of seating engagement with valve seat 148 and is therefore adapted to control communication between reservoir 7 and pressure chamber 107.

At the other side of the piston 145 is a chamber 151 which is connected to the chamber 149 by way of a branch of passage 150, a choke 152, and a passage 153.

Contained in the chamber 151 is a pilot supply valve 154, which is adapted to be moved into and out of engagement with a valve seat 155 on the inner surface of the main supply valve 146 for controlling communication by way of a bore 156 between chambers 151 and 107.

Also contained in the chamber 151 are control springs 157 and 158 which at all times urge the main supply valve 146 and pilot supply valve 154 respectively toward their seats. The spring 157 is interposed between and operatively engages the piston 145 and a cap nut 159 which closes an opening in the casing 93. The spring 158 is encircled by the spring 157 and is interposed between and operatively engages the cap nut 159 and the pilot supply valve 154. The pilot supply valve 154 is provided with a fluted stem 160, which is slidably guided in the main supply valve 146 within the bore 156. When the pilot valve 154 is seated, the stem 160 extends through the bore 156 beyond the face of the main supply valve 146 and is adapted to be engaged by one end of a control plunger 161, which is axially aligned with the pilot supply valve 154 and which is slidably guided in a bore 162 in the casing 93. The end of the plunger 161 is of greater diameter than the bore 156, so that it will operatively engage the face of the main supply valve 146 after the pilot supply valve 154 has been moved a limited distance in opening direction.

The other end of the plunger 161 operatively engages with a convex surface 163 provided on one side of the arm 113 of the control lever 112. The opposite side of the arm 113 is provided with a convex surface 164 adapted to engage a convex surface 165 of a fulcrum member 166 having screw-thread connection with the casing 93. The fulcrum member 165 is adjustable relative to the casing 108 and is made so for the purpose of varying the positions of the several movable parts of the valve device to compensate for unavoidable inaccuracies in manufacturing and to compensate for wear.

*Operation*

In operation, let it be initially assumed that the brake equipment is devoid of fluid under pressure and that to condition the equipment for operation fluid under pressure is supplied to the brake pipe 2 in the usual manner.

The brake controlling valve device 1 will respond, in the usual manner, to the pressure of fluid thus supplied to the brake pipe 2 to charge the auxiliary reservoir 3 and the emergency reservoir 4 with fluid under pressure from said brake pipe, and to at the same time open to atmosphere, if not already open, the brake cylinder pipe 11 and thereby the pressure chamber 18 in the brake cylinder device 6. With pipe 11 thus open to atmosphere, the pilot diaphragm chamber 33 in the load compensating relay valve device 9 will also be open to atmosphere by way of passage 34 and pipes 35 and 11, which will permit the spring 50 to deflect the balancing diaphragm 32 against its stem 44 and rock beam 41 about its fulcrum connection with roller 64, regardless of the adjusted position of said roller, to deflect the pilot diaphragm 31 into contact with the casing, in which position these parts are shown in the drawing.

With the balancing diaphragm 32 positioned as just described, spring 63 will seat the fluid pressure supply valve 59 and the collar 56 on the release valve 53 will be just out of contact with the supply valve stem 58 and in engagement with the stop element 57, which will hold said release valve out of contact with its seat on the nut extension 48. With the release valve 53 thus open chambers 49 and 36, and thereby the connected compensating pressure chamber 24 in the brake cylinder device 5, will be open to atmosphere by way of chamber 52 and port 55. With both pressure chambers 18 and 24 in the brake cylinder device 5 thus open to atmosphere, the brake cylinder piston 29 will assume its brake release position, in which it is shown in the drawing, under action of the release spring 30.

Chamber 103 in the variable load relay valve device 8 will likewise be open to atmosphere by way of the passage 104, a branch of pipe 27, passage 38 in the load compensating relay valve device 9 and chamber 49, which, as just noted, is open to atmosphere. Chamber 105 will also be open to atmosphere by way of passage 106 and pipe 11, which, as previously noted, is connected to atmosphere by way of the brake controlling valve device 1. With chambers 105 and 107 at atmospheric pressure the diaphragms 94 and 95 will exert no force and a spring 167 will act upon a shoulder 168 of the follower and stem 97 for diaphragm 95 to effect downward movement of said follower and stem carrying with it the shaft 111 and causing the lever 112 to rock against the force of spring 120 about the point of contact with the adjustable fulcrum member 166 to release position in which it is shown in the drawing.

In release position of the lever 112 the plunger 161 will be just out of contact with the bottom of the fluted stem 160 of the pilot supply valve 154 and also the bottom surface of the main supply valve 146 and thus will permit spring 159 to hold the main supply valve on its seat 148 and the spring 158 to hold the pilot supply valve on its seat 155. Communication between chamber 149 and valve chamber 107 is therefore cut off.

Also, by reason of the engagement of the convex surfaces 124 and 125 of the arm 114 of the lever 112 with the respective shoulders 122 and 123 of the plunger 115 and by reason of the enclosure of the head 140 of the pilot exhaust valve 116 in the hooded nut 141, when the lever 112 is in release position as shown in the drawing, the control spring 167 will through the medium of said stem and said plunger have actuated the pilot exhaust valve 116 and thereby the main exhaust valve 117 downwardly to their unseated position. With the exhaust valve 117 open the usual pressure chamber (not shown) of the conventional brake cylinder device 6, will be open to atmosphere by way of pipe 110, passage 109, valve chamber 107, past valve 117 to chamber 135 and thence by way of passage 137.

With the pressure chamber in brake cylinder device 6 thus open to atmosphere a hollow stem 169 of said brake cylinder device will assume its release position in which it is shown in Fig. 1 of the drawings.

When fluid under pressure is supplied to the brake pipe 2 for charging the equipment as above mentioned, fluid under pressure from the brake pipe 2 will also flow from pipe bracket 13 by way of a pipe 170 to the load compensating valve device 9 and thence by way of means (not shown) and pipe 62 to the load reservoir 7 for charging said reservoir with fluid at the pressure carried in the brake pipe.

In response to a certain degree of pressure of fluid supplied from the pipe bracket 13 the load compensating valve device 9 will act through the medium of the shaft 77 to rock lever 76 in a counterclockwise direction and pull the connecting rod 79 in an upwardly direction. This movement of the connecting rod 79 will in turn rock the arm 81 in a clockwise direction about its fulcrum pin 82 and thus move the measuring arm 84 into contact with the unsprung part 89 of the truck. The measuring arm 81 as it is thus moved will first contact the side of the unsprung part 89 and will then be lifted vertically to bring the surface 88 thereof into engagement with the lowermost part of the unsprung part 89, this latter movement being relative to the arm 81 and being permitted by leaf spring 91.

Now assuming that the car is fully loaded the body thereof will occupy a position closer to the unsprung part 89 of the truck than when the car is empty. In this fully loaded position the surface 88 on the measuring element 84 may therefore initially occupy a position further away from the unsprung part 89 than when the car is empty. In charging the equipment on a fully loaded car the measuring arm 84 will therefore be moved by the load compensating valve device 9 a greater distance to bring the surface 88 of the measuring arm 84 into contact with the underside of the unsprung part 89 than is required when the car is empty. When the load compensating valve device 9 is thus operated to bring the measuring element 84 into contact with the underside of the sprung truck part 89 on the loaded car, the roller 64 will be actuated to its full-load position which is substantially under the end of the diaphragm follower stem 40.

For various degrees of load on the car, between empty and full-load, the car body will assume corresponding positions with respect to the unsprung part 89 of the car, and as a result, the measuring arm 84, and the fulcrum roller 64 as actuated by the load compensating valve device 9, will assume corresponding positions between the empty and full-load positions, as set forth in the previously mentioned patent.

With the equipment conditioned for operation, and with the brake pipe 2 fully charged to normal pressure, if either a service or an emergency reduction in pressure in said brake pipe is effected, the brake controlling valve device 1 will operate to supply fluid under pressure from either the auxiliary reservoir 3, or from both the auxiliary reservoir 3 and emergency reservoir 4, respectively, to the brake cylinder pipe 11 and thence to the main pressure chamber 18 in the brake cylinder device 5, in the usual well-known manner. Fluid at the pressure thus provided in the brake cylinder pipe 11 will flow through pipe 35 and passage 34 to the pilot diaphragm chamber 33 in the load compensating valve device 9.

Let it now be assumed that the fulcrum roller 64 is in the empty position in which it is shown on the drawing. The pressure of fluid in the pilot diaphragm chamber 33 will then deflect the diaphragm 31 downward and rock the beam 41 about the fulcrum connection with roller 64 and thereby act through stem 44 to move the diaphragm 32 and nut 46 in an upward direction into contact with the release valve 53 and then actuate said valve to open the supply valve 59. Upon opening of the supply valve 59, fluid under pressure from the load reservoir 7 will flow through pipe 62, passage 61 and the supply valve chamber 60 to chamber 49, and thence through passage 38 and pipe 27 to the compensating pressure chamber 24 in the brake cylinder device 5, and at the same time fluid under pressure will flow from passage 38 through choke 37 to chamber 36 at the upper side of diaphragm 32. Choke 37 is merely a stabilizing choke and its purpose is to prevent the pressure in diaphragm chamber 36 increasing ahead of that in the pressure chamber 24 of the brake cylinder device 5.

Fluid under pressure will thus continue to be supplied to the compensating pressure chamber 24 in the brake cylinder device and to diaphragm chamber 36 until such pressure acting on diaphragm 32, plus the pressure of spring 50, acting on one end of the beam 41 is increased to a degree sufficient to overbalance the pilot pressure in chamber 33 acting on diaphragm 31, whereupon diaphragm 32 will be deflected downwardly to permit closing of the supply valve 59 by spring 63 for preventing further flow of fluid under pressure to the compensating pressure chamber 24 in the brake cylinder device 5. When the supply valve 59 is closed, as just mentioned, there will be no further flow of fluid under pressure to and consequent increase in pressure of fluid in diaphragm chamber 36 whereupon deflection of diaphragm 32 will cease in a lap position in which the fluid pressure release valve 53 is still seated. With the fulcrum roller 64 in the empty position, substantially midway between the diaphragm stems 40 and 44, the pressure of fluid obtained in the compensating pressure chamber 24 of the brake cylinder device 5 will therefore be limited to a degree just slightly less than the pressure of fluid in the main brake cylinder pressure chamber 18 as determined mainly by the pressure of spring 50 on diaphragm 32.

The pressure of fluid thus provided in the compensating pressure chamber 24 of the brake cylinder device 5 acts over the area of the brake cylinder piston 17 outside of the hollow stem 21, and the force thus created is less than that due to pressure of fluid in the main pressure chamber 18 acting over the full area of said piston, so that said piston will be forced in the direction of the right hand against the force of the release spring 30 to apply the brakes with a pressure equal to the differential between these forces, this latter pressure being adequate to insure the desired braking of one truck of the empty car.

Now when the brake controlling valve device 1 operates to supply fluid under pressure to the brake cylinder pipe 11, the fluid at the pressure thus provided will also flow through passage 106 to the large diaphragm chamber 105 in the variable load relay valve device 8. Pressure of fluid in chamber 105 acting on the diaphragm 95, with the assistance of the presently compressed spring 120 acting through the medium of arm 114 of lever 112, will deflect said diaphragm upward carrying with it the shaft 111 and central portion of the lever 112 in the same direction. As the lever 112 is thus moved the arm 114 thereof will fulcrum on the adjacent end of the plunger 161, the force of the spring 158 acting on said plunger through the medium of the pilot supply valve 154 being sufficient to prevent movement of the plunger by the lever until, as will hereinafter appear, the pilot and main exhaust valves 116 and 117, respectively, are seated.

Since the end of the arm 113 is fulcrumed as just described, the arm 114 will be caused to move in the same direction as the diaphragm 95, follower 96a and stem 96b are moving, the lever 112 rocking slightly about the shaft 111 and the arm 113 rocking slightly on the end of the plunger 161. The arm 114 as it thus moves will force the plunger 115 in the same direction as the stem 96a is moving and first will cause the pilot exhaust valve 116 to seat on the main exhaust valve 117 and through the medium of said pilot exhaust valve will cause the main exhaust valve to seat.

When the main exhaust valve 117 is seated, the shoulder 122 on the plunger 115 will act as a stationary fulcrum for the arm 114 of the lever 112 so that as the stem 96a and diaphragm 75 continue to move upwardly the arm 113 will be caused to move in the same direction as said stem is moving, the lever rocking slightly about the shaft 111 and arm 114 rocking slightly on the shoulder 122.

The arm 113 as it is thus moved will force the plunger 161 in the same direction as the stem 96a is moving and said plunger being in engagement with fluted stem 160 of pilot supply valve 154 will cause this valve to be unseated against the opposing pressure of spring 158. Fluid under pressure will now flow from chamber 151 to chamber 107 at a faster rate than fluid is supplied thereto through the restricted passage 152. This will result in a reduction in the pressure of fluid in chamber 151 and as a consequence the pressure acting on piston 145 to maintain the valve 146 seated will be reduced.

After the pilot valve 154 has been unseated the plunger 161 will engage the face of the valve 146, at which time the combined pressures of fluid in chamber 151 and of springs 157 and 158 will slightly exceed main reservoir pressure in chamber 149 acting on that portion of the valve piston 145 which surrounds valve 146. In view of this only a slight increase in fluid pressure in diaphragm chamber 105 over that required to unseat the pilot valve 154 will be necessary to cause the valve 146 to be unseated against the opposing reduced seating pressure.

Upon a slight increase in fluid pressure in chamber 105 fluid under pressure supplied from load compensating reservoir 7 to chamber 149 by way of pipe 109 and passage 150 now will flow past the unseated supply valve 146 to chamber 107, whence it will flow through passage and pipe 110 to the brake cylinder device 6, thus at the same time effecting an application of the brakes on the other truck of the car.

It should be understood that the fluid pressure thus established in valve chamber 107 and consequently in the connected brake cylinder device 6 will not be equal to the pressure of fluid in the brake cylinder pipe 11 acting in chamber 105 for when the load compensating relay valve device 9 operates to supply fluid under pressure to chamber 24 by way of pipe 27, as previously described, fluid under pressure in pipe 27 will also flow to chamber 103 in the relay valve device 8.

The pressure of fluid thus supplied to chamber 103 will exert a force upon diaphragm 94 in a downward direction. Since diaphragm 94 is positively connected to diaphragm 95 by means of the stem and follower 96, the force thus exerted by diaphragm 94 is in direct opposition to that exerted by diaphragm 95. The pressure of fluid in chamber 103 being only slightly less than that in chamber 105 when the car is empty, the larger diaphragm 95 will always prevail and the resulting upward movement of the diaphragm assemblage will always effect the operation of the self-lapping unit 108 in the manner just described.

When the pressure of fluid in valve chamber 107 of the variable load relay valve device 8 becomes substantially equal to the resultant of pressure of fluid in chambers 105 and 103, the spring 157 and pressure of fluid in chamber 151 will act to seat the main supply valve 146 of the piston 145, after which the spring 158 will act to seat the pilot supply valve 154. The supply valves as they are thus moved to their seats, shifts the plunger 161 and thereby the arm 113 of the lever 112 in the same direction. Since the arm 114 of the lever 112 is fulcrumed on the plunger 115 this movement of the arm 113 will cause the diaphragm assemblage to move downwardly, i. e., toward the position in which it is shown in the drawing.

Thus it will be seen that a certain minimum braking force is provided by the brake cylinder device 6 to supplement a minimum force provided by the standard "ABLC" load compensating brake equipment when an empty car is being braked and the maximum fluid pressure is present in the compensating chamber 24 of the brake cylinder device 5.

If the fulcrum roller 64 of the load compensating relay valve device 9 is in its full-load position, substantially under the end of the diaphragm stem 40, the pressure of spring 50 on diaphragm 32 will hold said diaphragm and thereby the diaphragm 31 in the position in which they are shown in Fig. 1 of the drawings against the maximum pressure of fluid which will be provided in the brake cylinder pressure chamber 18 and thereby in the pilot diaphragm chamber 33 in effecting an application of brakes on the car. As a result, the release valve 53 will be maintained open by spring 50 so as to maintain the pipe 27 and the compensating pressure chamber 24 in the brake cylinder device 5 open to atmosphere, as a result of which, the raking force obtained on one truck of the fully loaded car will be governed by the pressure of fluid provided in chamber 18 acting over and times the full area of piston 17.

With the pipe 27 open to atmosphere by means of the release valve 53 being unseated the connected chamber 103 in the relay valve device 8 will also be open to atmosphere, thus permitting the pressure of fluid in chamber 105 acting upon diaphragm 95 and opposed solely by the spring 167 to govern and provide a maximum braking force on the other truck for the fully loaded vehicle by the supplementary brake cylinder device 6.

Now assume that the fulcrum roller 64 is adjusted midway between its empty and full-load positions, for example, for a car half loaded, fluid will be provided in the compensating pressure chamber 24 in the brake cylinder device 5, and thereby in diaphragm chamber 36 in the compensating device, until the pressure thereof plus that of spring 50 is able to overbalance the pressure in the pilot diaphragm chamber 33 so as to permit closing of the supply valve 59, whereby the brakes for the one truck of the car will be applied by force, governed by the pressure of fluid in chamber 18 acting on the full area of piston 17 less the opposing pressure of fluid in the compensating pressure chamber 24 acting on a smaller area of said piston, which opposing pressure is proportional to the semi-loaded condition of the car, whereby the braking power delivered by the brake cylinder device 5 for braking the one truck on the car will be proportional to the semi-loaded condition of the car. It will be apparent that for any other adjustment of the fulcrum roller 64 between its empty and full-load positions the pressure of fluid in the compensating pressure chamber 24 of the brake cylinder device 5 will be correspondingly limited so as to provide a braking force for the one truck on the car proportional to the degree of load on the car.

In the relay valve device 8, the diaphragm assemblage, being subject to the opposing pressures of fluid in brake cylinder pipe 11 and load compensating pipe 27, will operate the self-lapping valve unit 108 in response to a pressure differential similar to that established in the brake cylinder device 5 to supply fluid under pressure to the brake cylinder device 6 until the device 6 delivers a braking power for braking the other truck on the car to a degree corresponding to the degree of braking power exerted on the first truck, which will, of course, be proportional to the semi-loaded condition of the car.

Upon an increase in pressure of fluid in brake pipe 2 for causing operation of the brake controlling valve device 1 to effect a release of fluid under pressure from the brake cylinder pipe 11 and thereby from the main pressure chamber 18 in the brake cylinder device 5 for releasing the brakes, a corresponding reduction in pressure of fluid in the pilot diaphragm chamber 33 will occur. As the pressure of fluid in chamber 33 is thus reduced the pressure of fluid in chamber 36, plus the pressure of spring 50, will deflect the diaphragm 32 and thereby rock the beam 41 about its fulcrum connection with roller 64 for pulling the nut extension 48 out of engagement with the release valve 53. Upon opening of the release valve 57 fluid under pressure will be released from the compensating pressure chamber 24 in the brake cylinder device 5 along with the release of fluid under pressure from the main pressure chamber 18. When the pressure of fluid in pressure chamber 18 of the brake cylinder device 5 is reduced below the opposing pressure of the release spring 30 the release spring will return piston 17 as shown in Fig. 1 of the drawings.

The brake cylinder device 6 will also assume release position at substantially the same time as brake cylinder device 5 does, since upon a reduction in the pressure of fluid in brake cylinder pipe 11 a corresponding reduction in the pressure of fluid in chamber 105 of the relay valve device 8 occurs. The pressure of fluid in chamber 105 is likewise reduced to atmospheric pressure when pipe 27 is opened to atmosphere by the release valve 57. The combined pressures of spring 167 and fluid in chamber 107 acting on the inner face of the diaphragm 95 then causes the diaphragm assemblage to move downward, carrying lever 112 mounted on stem and follower 97 in the same direction.

At substantially the same time as the diaphragm 95 starts to move downward the end of the arm 113 of the lever 112 fulcrums on the fulcrum member 166 and thereafter the continued movement of the stem 97 downwardly causes the arm 114 of the lever and thereby the plunger 115 to move in the direction of the diaphragm assemblage, the plunger compressing the spring 120. The plunger in its movement first moves the pilot exhaust valve 116 from its seat against the opposing pressure of fluid in valve chamber 107. Fluid under pressure in chamber 107 will then flow by way of bore 139 in valve 117 to chamber 134 thus balancing the pressures acting on said valve. The pilot exhaust valve will then act through the medium of the valve stem 143 and stop nut 144 to move the main exhaust valve 117 out of engagement with its seat. Fluid under pressure thus supplied to chamber 134 will slowly flow to atmosphere by way of port 133, chamber 135 and passage 137.

With the main exhaust valve 117 unseated fluid under pressure flows from chamber 107 and the connected brake cylinder device 6 to the atmosphere by way of the open valve, a chamber 171 and a passage, thus permitting said brake cylinder device to retract its hollow stem 169 to release position in which it is shown in the drawing.

Summary

It will now be seen that there has been provided a relatively simple variable load brake equipment for heavy cars outside of the normal weight range which may be used in conjunction with the standard "ABLC" load compensating brake equipment. The equipment constitutes a self-lapping valve device which is adapted to set up the pressure of fluid in the compensating chamber of the standard "ABLC" brake cylinder against the pressure of fluid in the main pressure chamber of the same and to supply fluid under pressure to a supplementary brake cylinder of the conventional type in accordance with the resultant. By this means, the supplementary brake cylinder device pressure increases proportionately as the compensating chamber pressure decreases and vice versa and hence the effectiveness of the supplementary brake cylinder device varies with the effectiveness of the compensating brake cylinder device 5. Under all empty or loaded conditions of the car the braking of the car provided by the load compensating brake cylinder for one truck will be augmented by the braking provided by the conventional brake cylinder for the other truck.

Having now described my invention, what I claim as new and desire to secure by Letters Patent, is:

1. A fluid pressure brake equipment for a vehicle comprising in combination, a brake pipe, a brake cylinder, valve means having two pressure chambers and operative to supply fluid under pressure to said brake cylinder, brake controlling means operative upon a reduction in pressure in said brake pipe to supply fluid under pressure to one of said chambers, and control means comprising valve means operative upon a reduction in brake pipe pressure to supply fluid under pressure to the other of said chambers.

2. A fluid pressure brake equipment for a vehicle comprising in combination, a brake pipe, a brake cylinder, valve means having two pressure chambers operative to supply fluid under pressure to said brake cylinder, said valve means being operative in response to the preponderance of force exerted by the pressure of fluid in one chamber over the force exerted by the pressure of fluid in the other chamber to supply fluid under pressure to said brake cylinder accordingly, brake controlling means operative upon a reduction in pressure in said brake pipe to supply fluid under pressure to one of said chambers, and control means comprising valve means operative in response to the pressure of fluid supplied to said one chamber to supply fluid under pressure to said other chamber.

3. A fluid pressure brake equipment for a vehicle comprising in combination, a brake pipe, a brake cylinder, valve means having two pressure chambers and operative to supply fluid under pressure to said brake cylinder, brake controlling means operative upon a reduction in pressure in said brake pipe to supply fluid under pressure to one of said chambers, and control means comprising valve means operative in response to the pressure of fluid supplied to one of said chambers to supply fluid under pressure to the other of said chambers.

4. A fluid pressure brake equipment for a vehicle comprising in combination, a brake pipe, a brake cylinder, valve means having two pressure chambers and operative in response to a preponderance of force exerted by the pressure of fluid in one chamber over the force exerted by the pressure of fluid in the other chamber to supply fluid under pressure to said brake cylinder accordingly, brake controlling means operative upon a reduction of pressure in said brake pipe to supply fluid under pressure to one of said chambers, and control means comprising valve means operative in response to the pressure of fluid supplied to said one chamber to supply fluid under pressure to the other of said chambers.

5. In a fluid pressure brake equipment for a car, in combination, a brake pipe, a brake cylinder device operable by fluid under pressure to brake said car, valve means comprising differential area movable abutment means operable in accordance with the pressure of fluid in one chamber acting on a larger area as opposed by pressure of fluid in a second chamber acting on a smaller area to provide a proportional pressure in said brake cylinder device, brake controlling means operable upon a reduction in brake pipe pressure to supply fluid under pressure to said one chamber, and a mechanism for varying the pressure of fluid in said second chamber substantially inversely in proportion to the load on the car.

6. A fluid pressure brake equipment for a load carrying vehicle comprising in combination, a brake cylinder, a reservoir, valve means comprising two pressure chambers and movable abutment means subject opposingly to the pressures of fluid in said chambers, said valve means being operative by said movable abutment means in response to the pressure of fluid in one of said chambers to supply fluid under pressure from said reservoir to said brake cylinder in accordance with the differential in pressure of fluid in said chambers, a brake pipe, brake controlling means operable upon a reduction in brake pipe pressure to supply fluid under pressure to said one chamber, and a load compensating means comprising an adjustable element and a mechanism for variously positioning said element in accordance with the weight of the vehicle between full-load and empty positions, said compensating means being operative in response to the pressure of fluid in said one chamber to supply fluid from said reservoir to the other of said chambers at a pressure proportional to the adjustment of said compensating means and the pressure of fluid in said one chamber.

7. A fluid pressure brake equipment for a load carrying vehicle comprising in combination, a brake cylinder, valve means comprising two pressure chambers and movable abutment means subject opposingly to the pressure of fluid in said chambers, said valve means being operative in response to the pressures of fluid in said chambers to supply fluid under pressure to said brake cylinder in accordance with the differential pressure of fluid in said chambers, a brake pipe, brake controlling means operable upon a reduction in brake pipe pressure to supply fluid under pressure to one of said chambers, and a load compensating means comprising an adjustable element and a mechanism for variously positioning said element in accordance with the weight of the vehicle between full-load and empty positions, said compensating means being operable in response to the pressure of fluid in said one chamber to supply fluid to the other of said chambers at a pressure proportional to the adjustment of said compensating means and the pressure of fluid in said one chamber.

8. A fluid pressure brake equipment for a load carrying vehicle comprising in combination, a brake cylinder, valve means comprising two pressure chambers and movable abutment means subject opposingly to the pressures of fluid in said chambers, said valve means being operative in response to a preponderance of force exerted by the pressure of fluid in one chamber over the force exerted by the pressure of fluid in the other chamber to supply fluid under pressure to said brake cylinder accordingly, a brake pipe, brake controlling means operable upon a reduction in brake pipe pressure to supply fluid under pressure to said one chamber, and a load compensating means comprising an adjustable element and a mechanism for variously positioning said element in accordance with the weight of the vehicle between full-load and empty positions, said compensating means being operative in response to the pressure of fluid in said one chamber to supply fluid to the other of said chambers at a pressure proportional to the adjustment of said compensating means and the pressure of fluid in said one chamber.

9. A fluid pressure brake equipment for a vehicle in combination, a brake cylinder, valve means having two pressure chambers and a movable abutment operative to supply fluid under pressure to said brake cylinder in accordance with the pressure of fluid in said chambers, a brake pipe, brake controlling means operable upon a reduction in the pressure of fluid in said brake pipe to supply fluid under pressure to one of said chambers for operation of said valve means, and a relay valve device operative in response to the pressure of fluid supplied to the one pressure chamber to supply fluid to the other of said pressure chambers at degrees of pressure proportional relative to the degree of pressure in said one pressure chamber and inversely to the weight of the load on the vehicle.

10. A fluid pressure brake equipment for a vehicle comprising in combination, a brake pipe, a brake cylinder device comprising a piston having on one side a certain area which is subject to pressure of fluid in one chamber and having a reduced area on the opposite side subject to the pressure of fluid in a second chamber, and operative to provide a braking force on one truck of the vehicle in accordance with the differential in forces developed on opposite sides of said piston by pressure of fluid in said chambers, brake controlling means operative upon a reduction in pressure in said brake pipe to supply fluid under pressure to said one chamber, control means comprising valve means operative upon a reduction of pressure in said brake pipe to supply fluid under pressure to said second chamber, a second brake cylinder device having a piston subject to pressure of fluid on one side only, movable abutment means having a movable abutment of a certain area which is subject to the pressure of fluid in said one chamber and having another movable abutment of a reduced area subject oppositely to the pressure of fluid in said second chamber, and valve means operative by said movable abutment means to supply fluid under pressure to said second brake cylinder device for providing a braking force on the other truck of the vehicle in accordance with the differential forces developed on the opposing movable abutments by pressure of fluid acting thereon.

11. A fluid pressure brake equipment for a vehicle comprising in combination, a brake pipe, a brake cylinder device comprising a piston having on one side a certain area which is subject to pressure of fluid in one chamber and having a reduced area on the opposite side subject to the pressure of fluid in a second chamber, and operative to provide a braking force on one truck of the vehicle in accordance with the differential in forces developed on opposite sides of said piston by pressure of fluid in said chambers, brake controlling means operative upon a reduction in pressure in said brake pipe to supply fluid under pressure to said one chamber, control means comprising valve means operative upon a reduction of pressure in said brake pipe to supply fluid under pressure to said second chamber, a second brake cylinder device having a piston subject to pressure of fluid on one side only, movable abutment means comprising one diaphragm subject to the pressure of fluid supplied to said one chamber and a smaller diaphragm subject oppositely to the pressure of fluid supplied to said second chamber, and valve means operative by said movable abutment means to supply fluid under pressure to said second brake cylinder device for providing a braking force on the other truck of the vehicle in accordance with the differential in forces developed on the opposing movable abutments by pressure of fluid acting thereon.

12. The combination with a variable load vehicle brake equipment of the type comprising a brake pipe, first and second brake cylinder pipes, a brake controlling valve device operable upon a reduction of pressure of fluid in said brake pipe to supply fluid under pressure to said first brake cylinder pipe and upon an increase in pressure in said brake pipe to release fluid under pressure from said first brake cylinder pipe, one relay valve device comprising a balancing lever having a fulcrum, two movable abutments subject, respectively and opposingly, to pressure of fluid in said first and second brake cylinder pipes and connected to said lever, and valve means controlled by said lever for varying the pressure of fluid in said second brake cylinder pipe according to variations in the pressure of fluid in said first brake cylinder pipe, said fulcrum being adjustable relative to said lever for varying the effectiveness of said valve means according to the load on the vehicle, means operative to adjust said fulcrum according to the load on the vehicle of, a brake cylinder, and a second relay valve device comprising two other movable abutments subject, respectively and opposingly, to pressure of fluid in said first and second brake cylinder pipes, and valve means controlled by said other movable abutments for varying the pressure of fluid in said brake cylinder according to variations in pressure of fluid in said first and second brake cylinder pipes.

13. The combination with a load compensating brake equipment of the type having a brake cylinder with a main pressure chamber and a load compensating pressure chamber and having a load adjustable relay valve device operative in response to the pressure of fluid supplied to said main pressure chamber to supply fluid from said load compensating reservoir to said load compensating chamber at pressures proportioned according to the degree of pressure in said main pressure chamber and according to the degree of load on the vehicle of, a second brake cylinder, movable abutment means subject oppositely to pressures of fluid in said pressure chambers, and valve means controlled by said movable abutment means for supplying fluid under pressure to said second brake cylinder at pressures varying according to the variations in pressure of fluid in said pressure chambers.

14. In a load compensating fluid pressure brake equipment for a load carrying vehicle of the type having a brake cylinder with a main pressure chamber and a load compensating pressure chamber and having a load adjustable relay valve device operable in response to the pressure of fluid supplied to said main pressure chamber to supply fluid from a load compensating reservoir to said load compensating chamber at pressures proportioned according to the degree of pressure in said main pressure chamber and according to the degree of load on the vehicle, the combination with said reservoir, a second brake cylinder, a second relay valve device comprising two movable abutments subject respectively and opposingly, to pressure of fluid in said pressure chambers, and valve means controlled by said movable abutments for controlling the flow of fluid under pressure from said source of supply to said second brake cylinder according to variations in pressure of fluid in said pressure chambers.

15. In a load compensating fluid pressure brake equipment for a load carrying vehicle of the type having a brake cylinder with a main pressure chamber and a load compensating pressure chamber and having a load adjustable relay valve device operable in response to the pressure of fluid supplied to said main pressure chamber to supply fluid from a load compensating reservoir to said load compensating chamber at pressures proportioned according to the degree of pressure in said main pressure chamber and according to the degree of load on the vehicle, the combination with said load compensating reservoir, of a supplementary brake cylinder device, and a second relay valve device comprising movable abutment means subject on one side to the pressure of fluid supplied to said main pressure chamber and subject on the other side to the pressure of fluid supplied to said load compensating pressure chamber, and valve means operable by said movable abutment means to supply fluid from said load compensating reservoir to said supplementary brake cylinder device at a pressure corresponding to the difference in pressures acting on said movable abutment means.

16. The combination with a vehicle fluid pressure brake equipment of the type embodying a brake cylinder device having a usual pressure chamber at one side of the brake cylinder piston and a compensating chamber at the opposite side, brake controlling means operative upon a reduction in brake pipe pressure to supply fluid under pressure to said usual chamber and mechanism for varying the pressure of fluid in said compensating chamber substantially inversely in proportion to the load on the car, of another brake cylinder device having a pressure chamber, and valve means automatically operative in accordance with the pressures in the two chambers of the first named brake cylinder device for varying pressure of fluid in the pressure chamber of said other brake cylinder device substantially in direct proportion to the load on the car.

17. A fluid pressure brake equipment for a vehicle comprising a brake pipe, a brake cylinder device, a self-lapping relay valve device comprising differential area movable abutment means and valve means operable by pressure of fluid acting on the larger area of said abutment means as opposed by pressure of fluid acting on a smaller area of said abutment means to govern pressure of fluid in said brake cylinder device, brake controlling means operable upon a reduction in pressure of fluid in said brake pipe to supply fluid under pressure to act on said larger area, and means automatically adjustable according to the load on the vehicle operative in response to operation of said brake controlling valve device to supply fluid to act on said smaller area at a pressure substantially inversely proportional to said load.

ELLIS E. HEWITT.

REFERENCES CITED

The following references are of record in the file of this patent:

UNITED STATES PATENTS

| Number | Name | Date |
|---|---|---|
| 976,000 | Schneck | Nov. 15, 1910 |
| 2,148,725 | Borde | Feb. 28, 1939 |